Apr. 10, 1923.
J. BERGE
1,450,909
TEMPERATURE COMPENSATING MEANS FOR SPEEDOMETERS
Filed Mar. 31, 1920   2 sheets-sheet 1
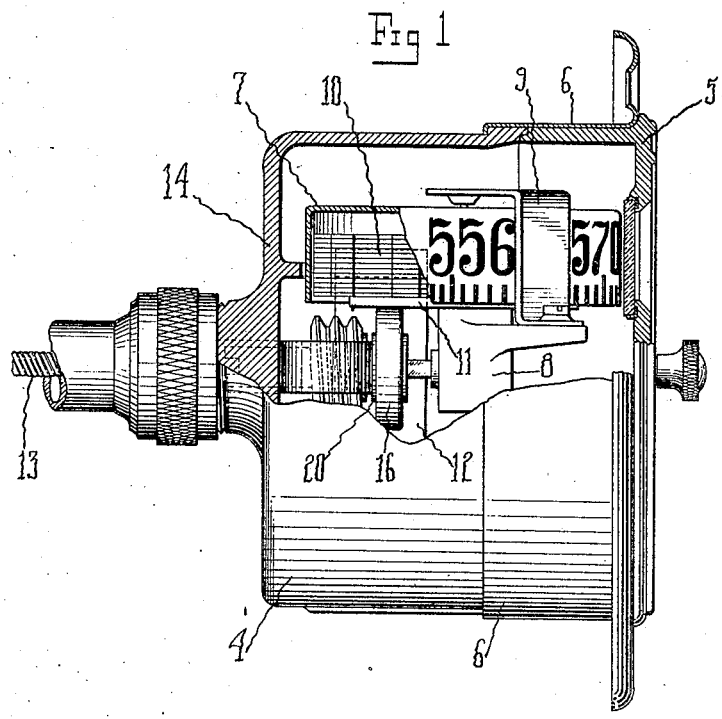
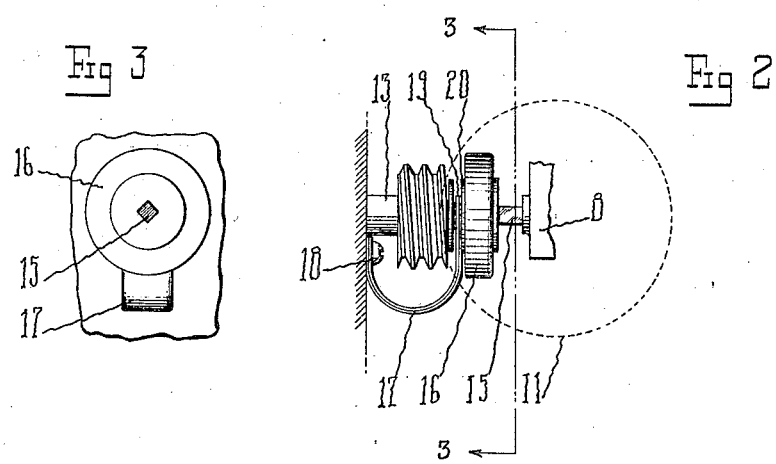
Inventor
Joseph Berge
By Attorneys Apr. 10, 1923.　　　　　　　　　　　　　　　　1,450,909
J. BERGE
TEMPERATURE COMPENSATING MEANS FOR SPEEDOMETERS
Filed Mar. 31, 1920　　　2 sheets-sheet 2

Inventor
Joseph Berge
By his Attorneys
Blackmore, Spencer & Flint

Patented Apr. 10, 1923.

1,450,909

UNITED STATES PATENT OFFICE.

JOSEPH BERGE, OF FLINT, MICHIGAN, ASSIGNOR TO A C SPARK PLUG COMPANY, OF FLINT, MICHIGAN, A CORPORATION OF MICHIGAN.

TEMPERATURE COMPENSATING MEANS FOR SPEEDOMETERS.

Application filed March 31, 1920. Serial No. 370,164.

*To all whom it may concern:*

Be it known that I, JOSEPH BERGE, a citizen of the United States, and a resident of Flint, county of Genesee and State of Michigan, have invented certain new and useful Improvements in Temperature Compensating Means for Speedometers, of which the following is a full, clear, concise, and exact description, such as will enable others skilled in the art to which the invention relates to make and use the same, reference being made therein to the accompanying drawings, which form a part of this specification.

My invention relates to speedometers designed for use with motor driven vehicles to indicate the rate of speed at which the vehicle is being driven, and particularly to speedometers of the magnetic type wherein a rotatable speed cup or equivalent indicating member upon which figures are placed which indicate the speed is dragged along to a greater or less extent by an armature rotating in proximity with said speed indicating member, and between the poles of a magnet, the extent of angular movement imparted to the speed indicating member or cup being dependent upon the rate at which the armature is driven; this present invention being in the nature of an improvement upon the speedometer described and claimed in my prior application, Serial No. 289,821 filed April 14, 1919.

The principal object of this present invention is to provide improved thermostatically controlled means for compensating for temperature variations under which the speedometer may be operating, to thereby secure a correct and proper indication of the speed of the vehicle under the various temperature conditions under which the speedometer may be operating and to which it may be subjected.

A further object of my invention is to provide an improved temperature compensating mechanism for use in connection with speedometers, particularly of the magnetic type, and in which the armature of the speedometer is driven from the driving shaft which operates the same through two cooperating friction members; and in which the driving action between the said members is controlled by a thermostat in such a way as to vary the speed ratio between said parts, or the rate at which the driven one of them is driven by the driving member, as the temperature conditions under which the speedometer is operating change.

A further object of my invention is to provide an improved speedometer of the magnetic type wherein a rotating armature or magnet acts to impart angular movement to a speed indicating member located in the field of the magnet and in which the speed indications thereof will be correct and a proper indication of the rate at which the vehicle is driven, irrespective of the temperature of the surrounding atmosphere at any given time.

A further object of my invention is to provide an improved speedometer of the type or class referred to and wherein the shaft through which the instrument is driven acts to drive the rotating member thereof through a friction wheel and disc, thus avoiding the use of gears heretofore commonly used and providing an instrument which will operate more smoothly and satisfactorily, and one in which the noise due to the use of gears in mesh with one another will be avoided.

With the above and other objects of invention in view, my invention consists in the improved thermostatically controlled speedometer mechanism illustrated in the accompanying drawing and hereinafter described and claimed; and in such variations and modifications thereof, within the scope of the concluding claims, as will be obvious to those skilled in the art to which my invention relates.

Referring now to the drawing wherein the preferred embodiment of my invention is illustrated:

Figure 1 is a view showing a speedometer casing partly in side elevation, and partly broken away to show internal features of the instrument.

Figure 2 is a fragmentary view illustrating the thermostatically controlled driving mechanism of the instrument as seen from a position at right angles to Figure 1.

Figure 3 is a view showing a section upon a transverse plane indicated by the line 3—3, Figure 2.

Figure 4:
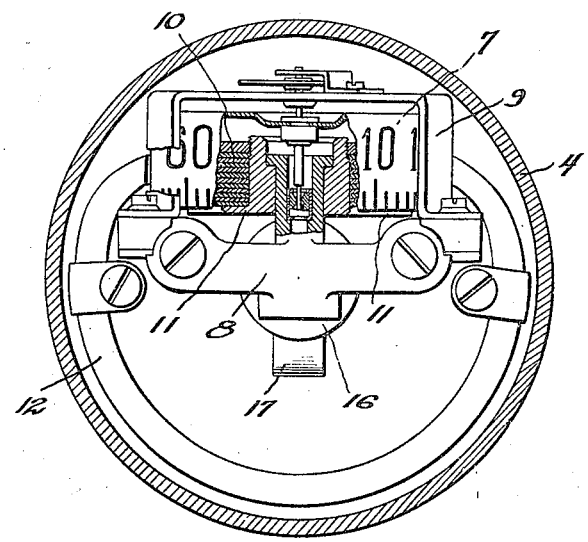
Figure 4 is a view showing a section upon a transverse plane passing through the casing of the instrument.

Referring now to the drawing, the reference numerals 4 and 5 designate two casing members which together provide a casing within which the operating elements of my improved speedometer are located, and which casing members are held together by a ring or band 6 in engagement with the periphery thereof, as in the instrument disclosed in my application for Letters Patent above referred to.

Located within the casing of the instrument is a cup-shaped speed indicating member or drag element 7 of the usual non-magnetic type supported from and adjacent the upper end of a vertically arranged shaft the lower end of which is supported by a bracket 8 secured in place within the casing of the instrument, and the upper end of which shaft is steadied by a yoke 9 secured to the said bracket.

Located within the cup-shaped speed indicating member 7 is a laminated armature or magnetic mass 10 which is rotatable about the same axis as the said speed cup rotates about; motion being communicated to said armature through a friction disc 11 secured to the under side thereof, so that the disc and armature rotate together about a bearing which is supported from the bracket 8. A suitable permanent magnet 12 is secured in place within the casing of the instrument and the poles of this magnet lie close to the depending periphery of the cup-shaped speed indicating member 1, one upon each side thereof, the position of the poles being indicated by dotted lines in Figure 1; so that the depending portion of the said cup-shaped member lies in a magnetic field extending from the poles of the magnet through the rotating armature 10, as is usual in magnetic speedometers of the class to which my invention relates.

The reference numeral 13 designates the driving shaft of the instrument, the same being driven from a wheel of the vehicle or from the propeller or other shaft through which the vehicle is driven from the engine. This driving shaft extends through a bearing provided in the rear wall 14 of the casing, and the forward end of said shaft is extended into the casing and its extremity is supported within a bearing provided in the bracket 8, as indicated in Figure 2. This extended portion 15 of the driving shaft is so formed as to communicate rotary motion to a friction wheel 16 which is slidable along said shaft, as will hereinafter appear, as for example by making said shaft square in cross section, and providing the hub of the friction wheel with a correspondingly shaped opening to receive said shaft.

The periphery of the friction wheel 16 is in driving engagement with the under side of the friction disc 11, as shown in Figure 1, so that rotary motion of the driving shaft 13 will be communicated to the armature 10 through the said friction wheel and friction disc thereby rotating the said armature and dragging the speed indicating cup 7 along with it, as is usual in magnetic speedometers, the extent of angular movement thus imparted to the speed indicating member being dependent upon the rate at which the armature is rotated. The said friction wheel is slidable along the squared portion of the driving shaft, from which it follows that the speed ratio between the driving shaft and the armature will be dependent upon the distance outward from the center of the disc 11 at which the periphery of said wheel contacts with the said disc.

The position of the friction wheel 16 upon the squared portion 15 of the driving shaft is determined by a thermostat 17 of the familiar two-metal strip type in the embodiment of my invention illustrated; although my invention, regarded in its broader aspects, comprehends other and equivalent thermostatically controlled means for varying the driving ratio between the driving shaft 13 and the armature 10 of the instrument, and is not limited to thermostatically controlled means employing a thermostat made of two strips of metal having unequal coefficients of expansion, as is the case in the thermostatic element 17 illustrated. One end of the thermostat 17 is shown as fixedly secured to the casing of the instrument as by means of a screw 18, while the free end thereof is bifurcated and enters into a groove 19 provided in the hub 20 which supports the friction wheel 16.

In view of the premises, and referring to Figure 1 of the drawing, it will be appreciated that the position of the friction wheel 16 with reference to the driving disc 11 is determined by the thermostatic element 17; and that said friction wheel will be moved to the right or left, thus varying the point of engagement between the periphery thereof and the under side of the disc 11 and, consequently, the speed ratio between the said members, as the temperature of the surrounding atmosphere varies; it being obvious that the friction disc and armature 10 will be driven faster as the said friction wheel is moved toward the right, and slower as said friction wheel is moved toward the left; the movement of said wheel being due to the expansion and contraction of the thermostatic element 17 which expansion and contraction is dependent upon and produced by changes in the temperature conditions under which the instrument is operating.

Having thus described and explained my invention, I claim and desire to secure by Letters Patent:

1. A speedometer comprising two members, one a magnet and the other a magnetic mass, one of said members being arranged for rotation, a non-magnetic drag element in the field of said magnet, a driving member for driving the rotatable member, and temperature controlled means for varying the speed ratio between the driven and driving members for compensating for changes in magnetic permeability of said magnetic mass due to variations in temperature.

2. In a speedometer of the class described, a driving shaft; a driven member driven from said driving shaft; speed indicating mechanism the operation of which is dependent upon the speed at which said driven member is driven from said driving shaft, the operation of said speed indicating mechanism also tending to vary with changes in temperature; and a thermostat for varying the driving action of said driving shaft upon said driven member to thereby vary the speed ratio between said driven member and said driving shaft to compensate for changes in the operation of said speed indicating mechanism which would otherwise occur with changes in temperature.

3. In a speedometer of the class described, a driving shaft; a friction wheel driven by said driving shaft; a friction disc with which the periphery of said friction wheel engages; speed indicating mechanism driven by said friction disc and whereby the rate of travel of the vehicle is indicated the construction of said mechanism being such that its operation tends to vary with the temperature; and thermostatic means for varying the driving action of said friction wheel upon said friction disc, to thereby vary the rate at which said friction disc is driven from said friction wheel to offset variations in speed indication otherwise incident to changes in temperature.

4. A magnetic speedometer comprising two members, one a magnet and the other a magnetic mass, one of said members being rotatable, a non-magnetic drag element arranged to intersect lines of force passing from said magnet through said magnetic mass, a driving shaft, a friction wheel driven by said driving shaft and slidable along the same and driving said rotatable member, and thermostatic means arranged to vary the position of said wheel to change the driving ratio for compensating for changes in electrical properties in the drag element due to changes in temperature.

5. In a speedometer of the class described, a driving shaft; speed indicating mechanism; two friction members one of which is driven from said driving shaft, and the other of which is operatively connected with said speed indicating mechanism to drive the same; and thermostatically controlled means for controlling the driving action between said friction members, to thereby vary the rate at which said speed indicating mechanism is driven from said driving shaft.

6. In a speedometer of the class described, a driving shaft; speed indicating mechanism; and temperature controlled driving means intermediate said driving shaft and said speed indicating mechanism for varying the speed ratio at which said speed indicating mechanism is driven from said driving shaft.

7. In a speedometer of the class described, a driving shaft; a friction wheel driven by said driving shaft and slidable along the same; a thermostat operatively connected with said friction wheel to thereby vary its position upon said driving shaft; a friction disc with which the periphery of said friction wheel contacts, and which disc is driven by said friction wheel; an armature carried by said friction disc and rotating therewith; a rotatable cup-shaped speed indicating member within which said armature is located and a magnet whose field intersects said indicating member and said armature.

8. In mechanism of the class described, the combination of driving means, driven means, variable speed mechanism for transmitting motion from said driving means to said driven, and temperature responsive means for varying the speed ratio at which motion is transmitted by said mechanism to compensate for variations in the operation of the mechanism due to change in temperature.

In testimony whereof I affix my signature.

JOSEPH BERGE.